Sept. 20, 1960  H. L. ANDERSON  2,953,510
NEUTRONIC REACTOR

Filed Nov. 30, 1944  5 Sheets-Sheet 1

Inventor:
Herbert L. Anderson
By: Robert A. [signature]
Attorney

Sept. 20, 1960 H. L. ANDERSON 2,953,510
NEUTRONIC REACTOR
Filed Nov. 30, 1944 5 Sheets-Sheet 3

Inventor:
Herbert L. Anderson
By: Robert A. Lavender
Attorney

Sept. 20, 1960     H. L. ANDERSON     2,953,510
NEUTRONIC REACTOR

Filed Nov. 30, 1944     5 Sheets-Sheet 4

Inventor:
Herbert L. Anderson
By: Robert A. Levender
    Attorney.

FIG.14.

United States Patent Office 2,953,510
Patented Sept. 20, 1960

2,953,510

NEUTRONIC REACTOR

Herbert L. Anderson, Chicago, Ill., assignor to the United States of America as represented by the United States Atomic Energy Commission Filed Nov. 30, 1944, Ser. No. 566,000

1 Claim. (Cl. 204—193.2)

My invention relates to the general subject of neutronics and more particularly to a fluid-cooled, self-sustaining, neutron chain reacting system operating by virtue of neutron fission of a fissionable component such as uranium, for example, natural uranium having a $U^{235}$ isotope content of approximately $1/139$ of $U^{238}$, which is the preponderant isotope present. More specifically, my invention relates to a neutronic chain reacting system having cooling means of low neutron absorption characteristics which effectively cools with a minimum reduction in the self-maintaining characteristics of the system and therefore allows operation at relatively high values of neutron density and at relatively high rates of power as compared with a neutronic reactor having no cooling facilities other than the normal conduction into the surrounding atmosphere, such a reactor being referred to hereinafter as an uncooled reactor.

Due to the fact that the isotope $U^{235}$ in natural uranium can be split or fissioned by bombardment with thermal neutrons, that is, neutrons in thermal equilibrium with the surrounding medium, a neutronic reactor operating at high neutron densities is possible. In such a system, the fission neutrons produced lead to the production of new fission neutrons in sufficiently large number to overcome the neutron losses in a system of practical size. Since the result of the fission of the uranium nucleus is the production of two lighter elements with great kinetic energy, plus approximately an average of two neutrons for each fission, along with beta and gamma radiation, a large amount of power in the form of heat is released within the system. When this heat is properly dissipated, as by the use of a coolant, such a system is capable of continuous operation at higher neutron densities than when uncooled other than by the ambient atmosphere. This is true since the reaction may be permitted to proceed at a more rapid rate when heat is removed sufficiently rapidly to prevent overheating of the reactor.

Most of the neutrons arising from the fission process are set free with the very high energy of above one million electron volts average and are, therefore, not in condition to be utilized as thermal neutrons to create new fissions in $U^{235}$. The fast neutrons from fission, after they are created, must be slowed down to thermal energy before they are most effectivel to produce fresh fission by bombardment of additional atoms of $U^{235}$ or similar isotope. When a system is built in which neutrons are slowed down without much absorption until they reach thermal energy and then mostly enter into uranium particularly $U^{235}$ rather than into any other element, a nuclear chain reaction is obtained even with natural uranium. Light elements, such as deuterium, beryllium or carbon, the latter in the form of graphite, are used as slowing agents or neutron moderators. A special advantage of the use of the light elements mentioned, for slowing down fast fission neutrons, is that fewer collisions are required for slowing than is the case with heavier elements. Hydrogen would be most advantageous were it not for the fact that there is a high probability of neutron capture by the hydrogen nucleus. Carbon in the form of graphite is a relatively inexpensive, practical, and readily available moderator for slowing fast neutrons to thermal energies.

In order for the premise to be fulfilled that the fast fission neutrons be slowed to thermal energies in a moderator without too large an absorption in the uranium, certain types of geometrical arrangements of the uranium and the moderator are utilized for the most efficient reproduction of neutrons, particularly when solid moderators such as carbon and beryllium are used. When solid moderators are used, the system is sometimes called a pile, due to the fact that the moderator is usually in the form of stacked or piled blocks. However, a more appropriate term is a neutronic reactor.

The ratio of the number of fast neutrons produced by the fissions to the original number of fast neutrons in each generation in a system of infinite size, using specific materials, is called the reproduction or multiplication factor of the system and is denoted by the symbol K. When K is made sufficiently greater than unity to create a net gain in neutrons and the system then built to a sufficiently large size so that this gain is not entirely lost by neutron leakage from the exterior surface of the system, then a self-sustaining chain reacting system will produce power in the form of heat by nuclear fission of natural uranium. The neutron reproduction ratio ($r$) in a system of finite size differs from K by a factor due to neutronic leakage from the exterior surface of the system and this ratio must be sufficiently greater than unity to permit the neutron density to rise exponentially in the system. Such rise will continue indefinitely if not controlled at a desired density corresponding to a desired heat or power output.

During the interchange of neutrons in a system comprising bodies of uranium of any size in a neutron moderator, neutrons are lost to the chain reaction in four ways, by absorption in the uranium metal or compound without producing fission, by absorption in the moderator, by absorption in any neutron absorbing impurities present in the system, and by leakage out of the system. These losses will be considered in the order mentioned.

Natural uranium, for example, particularly by reason of its $U^{238}$ content, has an especially strong absorbing power for neutrons when they have been slowed down to moderate velocities or so-called resonance energies. The absorption in uranium at these energies is termed the uranium resonance absorption or capture. It takes place in the isotope $U^{238}$ and does not result in fission, but leads to the creation of the relatively stable nucleus $94^{239}$, which is fissionable in a manner similar to $U^{235}$. Resonance absorption is not to be confused with absorption or capture of neutrons by impurities in the system, referred to later. Neutron resonance absorption in uranium may take place either on the surface of the uranium bodies, in which case the absorption is known as surface resonance absorption, or it may take place further in the interior of the uranium body, in which case the absorption is known as volume resonance absorption. Volume resonance absorption is due to the fact that some neutrons make collisions inside the uranium body and may thus arrive at resonance energies therein and are directly and immediately absorbed in the $U^{238}$. After successfully reaching thermal velocities, a large percentage of the thermal neutrons are also subject to capture by $U^{238}$ with out fission, again leading to the production of $94^{239}$.

When a neutron is absorbed by $U^{238}$ without fission taking place the following reaction occurs:

It is possible, by proper physical arrangement of the materials to reduce substantially the uranium resonance absorption. By the use of light elements as described above for moderators, a relatively large increment of energy loss is achieved in each collision and therefore fewer collisions are required to slow the neutrons to thermal energies, thus decreasing the probability of a neutron being at a resonance energy as it enters a uranium atom. During the slowing process, however, neutrons diffuse through the slowing medium over random paths and distances so that the uranium is not only exposed to thermal neutrons but also to neutrons of energies varying between the energy acquired by reason of fission and thermal energy. Neutrons at uranium resonance energies will, if they enter uranium at these energies, be absorbed on the surface of a uranium body, whatever its size, giving rise to surface absorption. Any substantial reduction of overall surface of the same amount of uranium exposed to neutrons will reduce surface absorption in the uranium, and any such reduction in surface absorption will make more neutrons available for use in the chain reaction, i.e., will increase the number of neutrons available for further slowing and thus for reaction with $U^{235}$ to produce fission.

For a given ratio of moderator to uranium, surface resonance absorption losses of neutrons in the uranium are substantially reduced by a large factor from the losses occurring in a mixture of fine uranium particles and a slowing medium, when the uranium is aggregated into masses of substantial size in which the mean spatial diameter is at least about 0.5 cm. for natural uranium metal, and somewhat larger for natural uranium oxide ($UO_2$) or other uranium compound. In such a case the reactor comprises a plurality of such uranium aggregates spaced apart within a neutron moderator. An important gain is thus made in the number of thermal neutrons retained and made directly available for the chain reaction and makes possible the use of solid moderators not otherwise suitable. Consequently, when solid moderators are used, the uranium in the system generally is incorporated in the form of spaced uranium masses or bodies of substantial size, preferably either of metal, oxide, carbide, or combinations thereof. The uranium bodies can be in the form of layers, rods or cylinders, cubes or spheres, or approximate shapes dispersed throughout a moderator, such as graphite, preferably in some geometric pattern. Optimum conditions are obtained with natural uranium and graphite by using metal spheres.

Assuming theoretically pure graphite carbon and theoretically pure uranium metal, both of the highest obtainable densities, the maximum possible K factor theoretically obtainable is about 1.1 when the uranium is aggregated with optimum geometry. Still higher K factors can be obtained by the use of aggregation in the case of uranium having more than the naturally occurring content of fissionable elements. Adding such fissionable material is termed enrichment of the uranium. K factors up to about 1.3 can be obtained when deuterium oxide, for example, is used as a moderator using lumped uranium.

The thermal neutrons in any chain reacting system are also subject to capture by the moderator. While carbon and beryllium absorb a small percentage of thermal neutrons, and deuterium a still smaller percentage, a small percentage of thermal neutrons is lost by capture in the moderator during diffusion therethrough. It is, therefore, desirable to have the fission neutrons reach thermal energy promptly, and then promptly enter uranium.

In addition to the above-mentioned losses, which are inherently a part of the nuclear chain reaction process, impurities present in both the moderator and the uranium add a very important neutron loss factor in the chain. The effectiveness of various elements as neutron absorbers varies tremendously. Certain elements such as boron, cadmium, samarium, gadolinium, and some others, if present even in a few parts per million, could prevent a self-sustaining chain reaction from taking place. It is highly important, therefore, to remove as far as possible all impurities capable of capturing neutrons to the detriment of the chain reaction from both the moderator and the uranium particularly with moderators which absorb substantial quantities of neutrons. If impurities, solid, liquid or gaseous, and in elemental or combined form, are present in too great quantity in the reactor, the self-sustaining chain reaction cannot be attained. The permissible amounts of impurities will vary for each specific geometry used in the system. The form in which the uranium is used—that is, whether natural or enriched, whether as metal or oxide— must also be considered. The type of moderator used—for example, whether deuterium, graphite, or beryllium—also influences the effect of impurities. The volume ratios between the uranium and the slowing down material also must be taken into account in evaluating the effect of impurities. Elements such as oxygen may be present, if not too large in quantity, and, as previously suggested, the uranium may be in the form of oxide, such as $UO_2$ or $U_3O_8$, or carbide, but the metal is preferred. Nitrogen may be present in fairly large amounts, and its effect on the chain reaction is such that the neutron reproduction ratio of the system may be changed by changes in atmospheric pressure. This effect may be eliminated by enclosing or evacuating the system with respect to nitrogen, as will later by described. All tubing and coolant introduced into a chain reacting system absorb neutrons and must be considered as impurities in the system. The effect on the chain reaction of all impurities can be determined as to the effect on the K factor, and the system designed to maintain the K factor well above unity.

An object of my invention, therefore, is to provide a cooling system for a neutronic reactor having tubing and coolant so arranged that despite the inherent characteristics of such foreign material as impurities, the cooling system will have a minimum depleting effect or absorption of neutrons otherwise available for self-maintenance of the chain reaction.

The strong neutron absorbing action of some elements renders a self-sustaining chain reacting system capable of control. By introducing neutron absorbing elements such as boron or cadmium in the form of rods or sheets or other form movable in or out of the interior of the system, preferably operating in the moderator between the uranium masses, the neutron reproduction ratio of the system can be changed in accordance with the amount of such absorbing material exposed to the neutrons in the system. A sufficient mass of the absorbing material can readily be inserted into the system to reduce the reproduction ratio of the system to less than unity and thus stop the reaction.

When the uranium and the moderator are of such purity and the uranium is so arranged that fewer neutrons are parasitically absorbed than are gained by fission, the uranium will support a chain reaction, thus providing an exponential rise in neutron density, provided the overall size of the system is sufficiently large to overcome the loss of neutrons escaping from the system. Thus the overall size is also important.

The overall size of the system will vary depending, among other things, upon the K factor of the system which is, as pointed out above, the ratio of neutrons generated to neutrons consumed neglecting neutrons loss due to leakage and is therefore predicated on a system of infinite size. If the reproduction factor K is greater than unit, the number of neutrons present will increase exponentially and indefinitely, or at least until the reactor has been stabilized by suitable control, provided the structure is made sufficiently large.

If, on the contrary, the structure is small with a large surface-to-volume ratio, there may be a rate of loss of neutrons from the structure by leakage through the outer surfaces which may overbalance the rate of neutron production inside the structure so that the chain reaction will not be self-sustaining. For each value of the reproduction factor K that is greater than unity, there is thus a minimum overall size of the structure known as the critical size, above which the rate of loss of neutrons by diffusion through the walls of the structure and leakage away from the structure is less than the rate of production of neutrons within the system, thus making the chain reaction self-sustaining. The rate of diffusion of neutrons away from a structure in which they are being created through the exterior surface thereof may be treated by mathematical analysis when the value of K is known.

In the case of a spherical structure employing uranium bodies of any shape or size imbedded in a carbon slowing material, the following formula gives the approximate overall radius for critical or operating size:

$$K - r = 7.4/R^2$$

where R is the radius in feet and $r$ is the reproduction ratio which for an operative reactor cannot be below unity and for critical size is unity.

For a parallelepiped structure rather than spherical, the critical size can be computed from the formula:

$$K - r = 7.4 \left( \frac{1}{a^2} + \frac{1}{b^2} + \frac{1}{c^2} \right)$$

where $a$, $b$, and $c$ are the lengths of the sides in feet. The critical size for a cylindrical structure is given by the formula, when $r=1$:

$$K - r = \frac{7.4}{h^2} + \frac{4.1}{R^2}$$

where $h$ is the height and R is the radius, both in feet irrespective of the shape of the uranium bodies.

In the case of spherical structure employing uranium bodies of any shape or size imbedded in a heavy water ($D_2O$) moderator, the following formula gives the critical overall radius:

$$R = \frac{56.5}{\sqrt{K - r}}$$

where R is the radius in centimeters and $r$ for critical size equals one.

For a rectangular parallelepiped structure rather than spherical, using a heavy water ($D_2O$) moderator, the critical size can be computed from the formula:

$$K - r = 323\pi^2 \left( \frac{1}{a^2} + \frac{1}{b^2} + \frac{1}{c^2} \right)$$

where $a$, $b$, and $c$ are the lengths of the sides in centimeters and $r=1$. The critical size for a cylindrical structure using a heavy water moderator is given, irrespective of the shape of the uranium bodies by the formula:

$$K - r = \frac{323\pi^2}{h^2} + \frac{777}{R^2}$$

where $h$ is the height in centimeters and R is the radius in centimeters and $r=1$.

It is customary to build a system just over critical size so that the reproduction ratio of the system is above, but close to unity with all permanent parasitic neutron absorbers in place, the removable neutron absorbers then being used to change the reproduction ratio from below unity to such points above unity as may seem desirable.

In order to reduce some of the leakage of neutrons, the active portion of the neutronic reactor, that is, the portion containing the uranium and moderator, is surrounded by a reflector made of a neutron scattering material having low neutron absorption characteristics, such as, for example, carbon. The purpose of the reflector is to reflect back into the active portion some of the neutrons that otherwise would be lost through the outer walls of the reactor so as to make such reflected neutrons useful in maintaining the chain reaction. In general, materials which are good neutron moderators are suitable reflectors. The reflector, taken together with the reactive portion, constitutes the complete neutronic reactor.

Consequently, by arranging the uranium in bodies or masses of suitable shape and size, by selecting a correct volume ratio of uranium to moderator, and further, by suitably limiting the impurities in the system (the uranium and the moderator) and by limiting the escape of neutrons from the system by making the neutronic reactor sufficiently large in size, more fast neutrons are produced in each generation by fission than were present to start the generation, so that the chain reaction in the system is perpetuated.

As the chain reacting pile is then capable of producing fast fission neutrons at a greater rate than the rate at which neutrons are lost from the system or otherwise dissipated or utilized, there would be an exponential rise in the neutron density to infinity or so long as such production rate continued, unless the rise is controlled. Removable neutron absorbers, i.e., impurities in the form of control rods, are used to control the exponential rise beyond desired limits by inserting such rods into the neutronic reactor. The point at which the exponential rise is stopped is then a matter of engineering choice, and, of course, will depend upon considerations involving safety and efficiency of heat removal. It is obvious that the rate of production of heat within the neutronic reactor will depend upon the ratio at which the reactor is permitted to occur which may be indicated by the neutron density in the system. The higher the neutron density, the greater the production of heat in the system and the higher the rate of production of $94^{239}$. About 92% of the total heat generated in a chain reacting system originates in the uranium, and about 6% originates in the moderator, where graphite is used. The remaining 2% is generated outside the pile, that is, in the surrounding structures. Heat also is conducted into the moderator from the uranium bodies.

When fission occurs by neutron capture, the following reaction takes place:

$_{92}U^{235} + n \rightarrow A + B +$ about 2n (average)

A="light" fission fragment, e.g., including Br, Kr, Rb, Sr, Y, Zr, Cb, Mo, 43, Ru, Rh. Atomic mass 83–99 inclusive. Atomic number, 34–45 inclusive.

B="heavy" fission fragment, e.g., including Sb, Te, I, Xe, Cs, Ba, La, Ce, Pr, Nd. Atomic mass, 127–141 inclusive. Atomic number 51–60 inclusive.

The fission elements are unstable and radioactive with half-lives varying in length in accordance with the element formed.

Following is a table showing more specifically the type and locale of the heat generated in a uranium-carbon system.

TABLE I

1. Summary by type

| | Approximate mev. per fission | Percent |
|---|---|---|
| Gamma radiation | 23 | 11 |
| Beta radiation | 11 | 6 |
| Kinetic energy of fission fragments | 159 | 79 |
| Kinetic energy of neutrons | 7 | 4 |
| Total | 200 | 100 |

2. Summary by locale where heat is generated

| | Approximate mev. per fission | Percent |
|---|---|---|
| In uranium | 184 | 92 |
| In carbon | 12 | 6 |
| Outside neutronic reactor | 4 | 2 |
| Total | 200 | 100 |

3. Summary by type and locale

| | Approximate mev. per fission | Percent in U | Percent in C | Percent outside |
|---|---|---|---|---|
| Kinetic energy of fission fragments | 159 | 100 | | |
| Kinetic energy of neutrons | 7 | | 90 | 10 |
| Gamma radiation from fission fragments and products | 5 | 70 | 25 | 5 |
| Beta radiation from fission fragments and products | 11 | 100 | | |
| Nuclear affinity of neutrons (gamma radiation) | 18 | 60 | 25 | 15 |

In order to control the temperature of the chain reaction and to prevent the accumulation of heat in the chain reacting system, a suitable circulating system can be employed to convey the heat away from the neutronic reactor, when a larger power output is desired. The design of this system within the neutronic reactor and the type of coolant employed are critical factors which, if not properly taken into consideration, will make it impossible to attain a self-sustaining chain reaction.

The problem of removing heat from a chain reacting system by means of a coolant in contact with the uranium interiorly of the neutronic reactor is complicated by various factors. The corrosive effect on uranium of most otherwise suitable circulating media is very troublesome. This factor is important primarily because of the presence in the system of high temperatures and intense neutron densities which accelerate rates of corrosion. One of the most serious consequences which may result from the corrosive action of a circulating medium on the uranium is the physical deterioration of the uranium in the system. It is essential then that the circulating system be of such a character as not to destroy the uranium bodies in the system.

The problem of cooling is further complicated by the fact that usual coolants and conduits suitable therefore absorb neutrons and unless the amount of coolant and conduit is properly apportioned or limited such neutron absorption will be so high that a chain reaction can not be maintained.

In accordance with my invention I have avoided many of these difficulties. In the invention herein contemplated a coolant such as water, diphenyl, or similar liquid or gas is used as the circulating medium to remove heat from the structure, conducted through tubing of aluminum, lead or copper, for example. The coolant is circulated through tubes placed in the reflector of the system and, therefore, the problem of excess neutron absorption is substantially reduced and the corrosion problem with respect to the uranium is eliminated. The heat is transferred from the uranium to the coolant by conduction through the moderator and reflector material and, while the amount of heat that can be removed within a given time from the neutronic reactor by cooling the reflector is less than that which could be removed by directly cooling the uranium with the same volume of coolant inserted into the neutronic reactor, reflector cooling in a uranium-carbon pile is capable of safely abstracting the heat equivalent of about 200,000 calories per second or about 840 kilowatts per hour from the neutronic reactor. Reflector cooling is especially advantageous since such cooling results in negligible neutron absorption and has only slight effect upon the maintenance of the reaction. It may be conducted in lieu or in conjunction with internal cooling without adversely affecting the operation of the reactor.

In accordance with a further modification of the invention special means may be provided to facilitate rapid heat transfer through the moderator to the coolant. Such heat transfer means may comprise a gas such as helium which is more heat conductive than air or may comprise heat conductive elements which have but little neutron absorption. This means may be used in conjunction with internally cooled as well as reflector cooled reactors.

Thus it is an object of my invention to provide a means and method of circulating a neutron absorbing cooling fluid in heat exchange relationship to a reaction chain reacting system, with minimum effect on the chain reaction therein.

It is a further object of the invention to provide means usually in gaseous form to facilitate heat transfer from the reactor to a coolant located internally or externally thereof.

The above and other objects, features and advantages of my invention will become apparent to those skilled in the art when taken in connection with the following description and the accompanying drawing showing an illustrative reactor wherein.

The reactors herein described are generally illustrative but it should be understood that the invention herein contemplated is applicable to reactors generally and thus may be applied to reactors such as described in an application for Letters Patent of Gale Young, filed September 5, 1944, Serial No. 552,730, now Patent No. 2,774,730.

As a self-sustaining chain reaction is not known to be possible with natural uranium and graphite without aggregation of the uranium into bodies of substantial size, I prefer to illustrate my invention by description of a reflector cooled, self-sustaining chain reacting system, in which the active portion is cubical, and in which highly purified uranium metal cylindrical lumps are utilized, imbedded in high quality graphite. The effect of impurities in the graphite is substantially the same as in the uranium since the neutrons diffuse freely in both materials.

Figure 1:
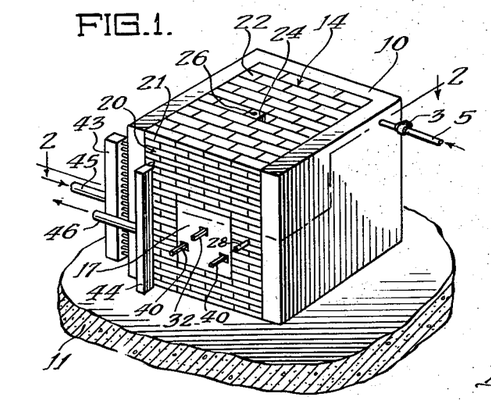
Fig. 1 is a schematic perspective view of the exterior of a chain reacting system.
Figure 2:
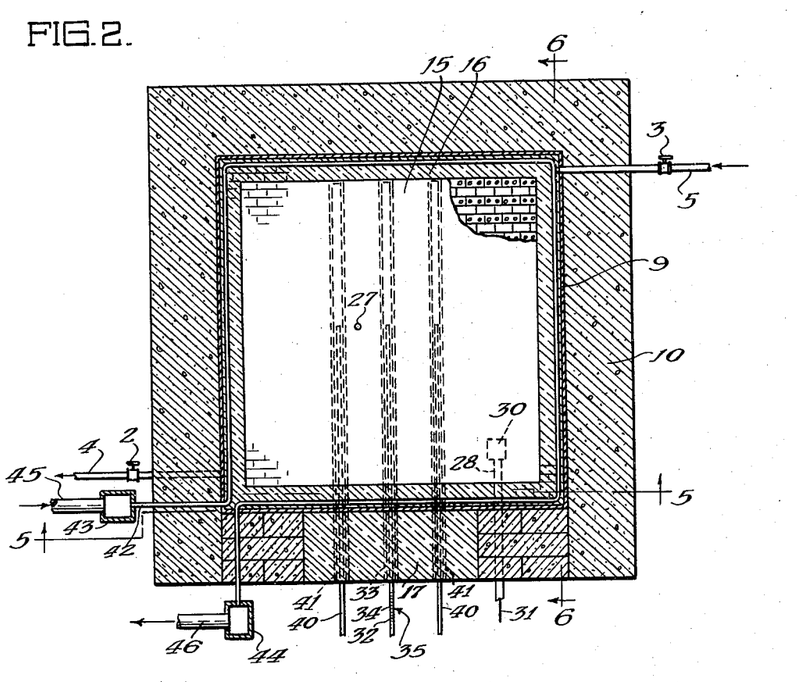
Fig. 2 is a horizontal section of the system on the line 2—2 in Fig. 1.

Referring first to Figs. 1 and 2 illustrating the completed structure, side walls 10 are erected on a heavy foundation 11, both preferably of poured concrete about 5 feet thick, leaving a vault space 14 inside walls 10 in which is built up, as will be explained later, an active portion 15 (Fig. 2) surrounded by a graphite reflector 16 which essentially encases the reactor itself. The reflector is built with a graphite projection 17 which extends to a plane flush with the outer surface of front wall 20 also 5 feet thick, formed of concrete bricks 21. The top of the structure is closed with covering bricks 22 also of concrete and 4 feet thick. The top covering is pierced by an aperture 24 constituting the mouth of a well 25 extending to at least the peripheral layer of uranium bodies in the active portion 15. A second aperture 26 is the exterior opening of a shaft 27 extending to the center of the structure but being interrupted by an aluminum sheath 9 described below.

Also entering the active portion 15 is a slot 28 at the end of which is positioned an ionization chamber 30 connected to the exterior by wire line 31.

Figures 3, 4:
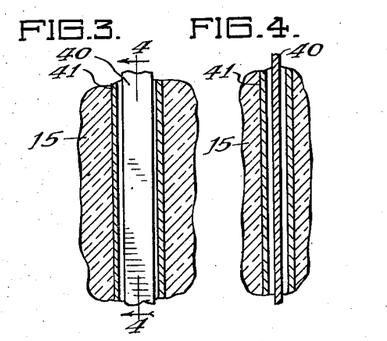
Fig. 3 is a fragmentary horizontal section through a slot in the reactor of Fig. 1.
Fig. 4 is a vertical section on the line 4—4 in Fig. 3.

Extending from the outside of projection 17 into the center of active portion 15 is a control rod 32 sliding into an aluminum lined slot 33 in the graphite. A scale 34 is provided on control rod 32 cooperating with diagrammatically illustrated index 35 to indicate the depth of penetration of the control rod 32 as shown in Fig. 2. Also extending into the active portion 15 through projection 17 are two safety rods 40 respectively operating in spaced, aluminum lined slots 41. Safety rods 40 and control rod 32 are preferably flat strips of cadmium or cadmium clad steel, as shown in Figs. 3 and 4, and are arranged to move freely in and out of aluminum lined slots 41 and 33, respectively.

Water tubes 42, preferably of copper, pass horizontally through holes 42a in the concrete side walls and pass through the reflector 16 of the active portion 15. On each side of the system the tubes enter headers 43 and 44 having connecting pipes 45 and 46, respectively, for coolant connection. An aluminum sheath 9, provided between the reflector 16 and concrete wall 10 is sufficiently thin so that it will not interfere with the transmission of radiations such as gamma radiation emitted through shaft 27 and emanating from aperture 26. This sheath 9 constitutes a casing for hermetically sealing a heat conducting gas such as helium within the reactor, as will appear hereinafter.

This completes the gross structure of the device. The active portion 15, that is, the portion including uranium and the graphite moderator and the reflector, will next be described.

The active self-sustaining chain reacting portion 15 to be built up within vault 14 is designed to so reduce neutron losses as to make a self-sustaining chain reaction possible, as has been previously outlined, using specific types and sizes of uranium metal masses, embedded in graphite, all of best obtainable purity, the uranium being spaced with a specific geometry.

Figure 7:
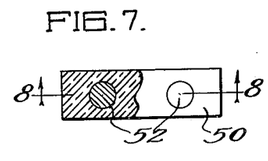
Fig. 7 is a top view partly in section of a live graphite block containing uranium.
Figure 8:
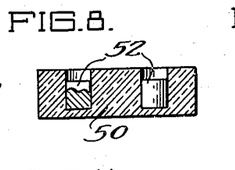
Fig. 8 is a section on line 8—8 in Fig. 7 but showing one uranium body in elevation and another uranium body partly in elevation.
Figure 10:
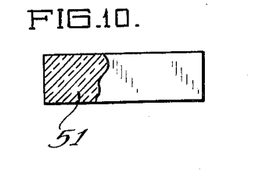
Fig. 10 is a view partly in section and partly in elevation of a dead graphite block.

In the system illustrated, the graphite is in the form of blocks or bricks having dimensions of 4" x 4" x 16", these blocks having been planed by woodworking machinery to have smooth rectangular sides. The danger sum of impurities in the graphite is below 0.02. Certain of the blocks 50 are drilled with two holes spaced 8" (20 cm.) center to center to receive the uranium bodies 52 which are placed therein, as shown in Figs. 7 and 8. These graphite blocks 50 are termed live graphite. Other blocks 51, as shown in Fig. 10, contain no uranium and may be termed dead graphite. The uranium bodies are cast uranium metal cylinders 52 having a density of at least 18 grams per cubic centimeter, and a danger sum of impurities less than about 0.01, each cylinder being about 2¼" in diameter and about 2¼" in height, weighing about 6 pounds each.

Figure 5:
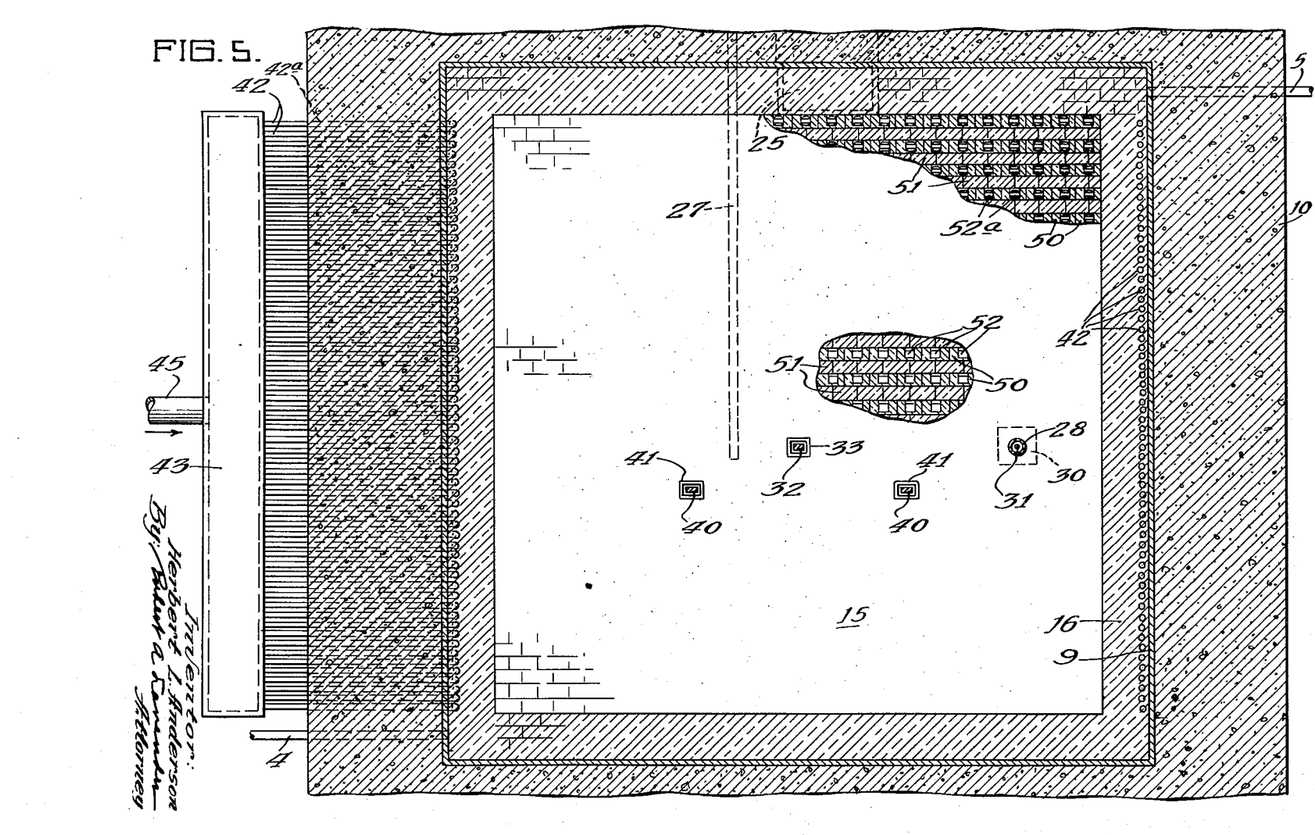
Fig. 5 is a vertical section on the line 5—5 in Fig. 2 with portions broken away to show interior construction.
Figure 6:
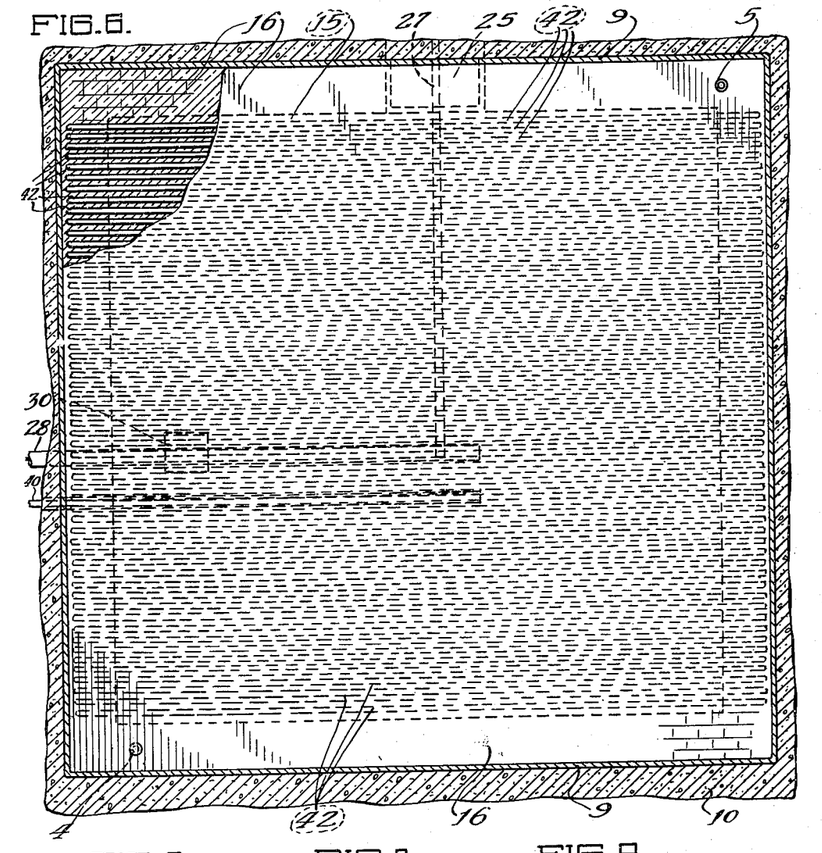
Fig. 6 is a section on the line 6—6 in Fig. 2.
Figure 9:
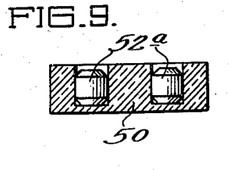
Fig. 9 is a vertical section of a live graphite block containing uranium oxide, the uranium oxide being shown in elevation.
Figure 14:
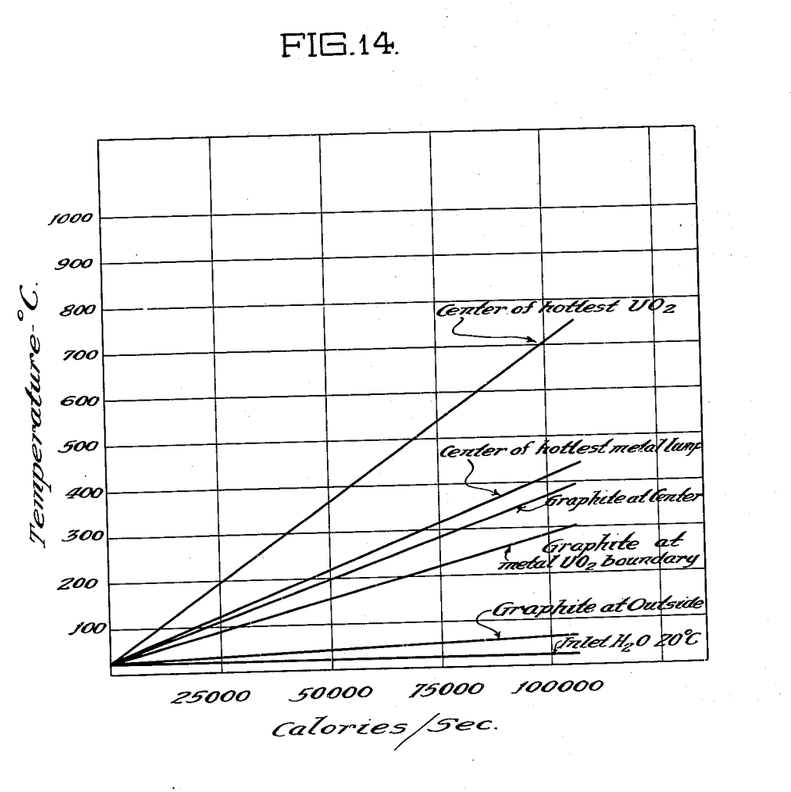
Fig. 14 is a graph showing internal temperatures of various materials in a neutronic reactor at different values of total heat dissipation or power.

Other blocks 50, as shown in Fig. 9, may be similarly drilled but contain uranium oxide bodies in the form of pseudospheres of radius about 1.5 in 52a and, if used, are preferably placed at the peripheral portion of the active portion 15 of the neutronic reactor as illustrated in Fig. 5. However, I prefer to use only uranium metal lumps, such as 52, throughout the reactor, inasmuch as such metal lumps have a thermal conductivity substantially greater than that of uranium oxide. For instance, the thermal conductivity of $UO_2$ is about 0.00034 whereas that of uranium metal is about 0.061. Referring to Fig. 14, it will be seen that at various values of rate of total heat which may be removed from a lump of the size herein contemplated or total operating power, the temperature at the center of the hottest uranium oxide lump is almost double that at the center of the hottest metal lump because of the poor heat conductivity of the uranium oxide. I have found that it is not desirable to operate uranium oxide lumps much above 200° C. because of the deleterious effect of higher temperatures which cause oxidation of the $UO_2$ to $U_3O_8$. $U_3O_8$ is not so effective as $UO_2$ in the reaction. This would mean that the maximum heat to be extracted from a neutronic reactor, using uranium oxide lumps operating below 200° C. in the outer layers of the reactor, would be limited to about 25,000 calories per second to prevent the oxidizing of the $UO_2$. While oxygen is mostly excluded by the helium atmosphere described below, some oxygen will still be present, and it is therefore not desirable to greatly exceed 200° C. as the temperature of the hottest $UO_2$ lump. On the other hand, if uranium metal lumps only are used throughout the reactor, it is possible to run the internal temperature of the lumps to 700° C. or even above, thereby giving a maximum safe heat extraction of about 200,000 calories per second, equivalent to about 838 kilowatts. A reactor having uranium metal throughout may therefore be operated at about four times the power of a reactor having uranium oxide therein.

While it has been seen that the heat transfer through the graphite is fair, it will be noted that such heat transfer is materially affected by the subdivision of the graphite mass into the form of bricks, thereby providing small air spaces between the adjoining contacting surfaces of the various graphite bricks. The heat transfer through the built up graphite mass is also very much affected by the relatively large air spaces immediately surrounding the uranium lumps, as will be readily observed from inspection of Figs. 8 and 9. The heat transfer through air is relatively poor but can be improved by substituting a superior heat transferring medium such as, for example, helium for air. The heat transfer coefficient between two graphite bricks shows a marked dependence on the gaseous medium which is used therebetween, indicating that the thermal resistance of contact between the graphite surfaces is largely that of the gas in the gap between the two surfaces.

In the present reactor, the gap between graphite bricks measured about .2 millimeter. The values of the heat transfer coefficient in calories/centimenter²/degree centigrade/second obtained were: for air, 0.0064; for helium, 0.016; and for hydrogen, 0.021. In these cases, the pressure of the gas was 1 atmosphere. In other words, the heat transfer coefficient of helium is about three times that of air. The heat transfer coefficient with air at 2 atmosphere's pressure had the value of 0.013, considerably higher than that found with a pressure of 1 atmosphere. This was due to a reduction in the thickness of the gap due to the compression by atmospheric pressure on the outside of the structure. The heat transfer coefficients between graphite constituting the reflector and a copper water cooling tube placed in a milled groove inside the graphite were found to be: for air, 0.0085; for helium, 0.0143; and for hydrogen, 0.0208. These results make it possible to determine the temperature distribution in a reactor cooled only by copper tubes, on the outside of the structure, with helium in all interspaces. Helium is most desirable as it is safe and has negligible neutron absorption.

For a structure of cubical shape with a side of 6 meters containing a core of 4 tons of uranium metal outside of which are 40 tons of pressed $UO_2$ and comprising a total of about 345 tons of graphite, the temperature distribution of the various constituents of the reactor, that is, the internal temperatures of uranium bodies, graphite, etc., at various values of operating power, are shown in Fig. 14. These results are for a neutronic reactor operating in an atmosphere of helium. With air inside the reactor, the temperature would rise to much higher values for a given power output. For water cooling, a total flow of 4–5 liters per second in 60 parallel paths of 3/8 inch copper tubing is adequate to dissipate up to 200,000 calories per second, that is, about 840 kilowatts. The pressure required to circulate this amount of water is somewhat less than 1 atmosphere. By ignoring the oxide curve, conditions for all metal reactors are shown, as the metal curve is for the hottest lumps, that is, those in the center of the reactor.

Helium is circulated through the neutronic reactor by means of pipes 4 and 5 (see Figs. 2 and 5). By closing valves 2 and 3, the helium may be maintained in a static condition in the reactor. One of the pipes 4 or 5 may be used to exhaust air from the reactor and the other for introducing helium. By virtue of the substantial increase in heat conductivity of the mass of graphite and uranium forming the neutronic reactor by the introduction of helium throughout the neutronic reactor, including reflector 16, it is possible to extract large quantities of heat from the reactor merely by placing the water tubes 42 exteriorly or peripherally of the neutronic reactor, for example, by placing them in the reflector 16 as shown in Fig. 5. In such external position, the inherent characteristics of water tubes 42, as relatively large impurity, will in reality have little or no detrimental effect on the neutron reproduction ratio since they are placed externally of the reactor where the neutrons absorbed would not otherwise return to the reactor. In addition, water tubes 42 inherently act as a shield for minimizing escape of penetrating radiations such as gamma rays.

Another disadvantage of operating a neutronic reactor in air is that nitrogen in the atmosphere infiltrates the reactor. Inasmuch as nitrogen absorbs neutrons, or, in other words, constitutes an impurity, it will have a detrimental effect on the neutronic reaction. Furthermore, as atmospheric pressure changes, there will be changes in the amount of nitrogen, that is, in the amount of impurity in the reactor, necessitating readjustments of the position of the control rod to maintain a predetermined power output.

By evacuating the nitrogen and thereby eliminating the impurity, it is possible to construct a smaller sized reactor capable of sustaining a chain reaction than if the reactor were operating in air. Furthermore, by charging the reactor with helium, which does not absorb neutrons and therefore does not constitute an impurity, and by maintaining the helium at a predetermined pressure, the reactor may be made even smaller and stability of operation is possible. Still further, if it is desired to operate the reactor at maximum power, it is possible to increase the pressure of helium to higher than atmospheric pressure so as to increase the heat conductivity within the reactor and thus permit extraction of a greater amount of heat generated or, in other words, to allow operation at higher rates of power. In this case, if 200,000 calories per second is exceeded, either the water flow can be increased, or additional tubes 42 installed.

The active portion 15 of the structure, which is to be built inside the vault, has about 30 layers of live graphite, alternating with layers of dead graphite to form a cube having side dimensions of approximately 6 meters. If only pure uranium lumps are used entirely, that is, if uranium oxide blocks are not used, a total amount of graphite of approximately 240 tons is used in the active portion. Approximately 80 tons of exceptionally pure cast uranium metal bodies are used for the cylinders. The total number of uranium metal bodies is about 27,000. The volume ratio is about 35 carbon to 1 uranium. If, on the other hand, a mixture of uranium and uranium oxide bodies are used as shown, a total amount of about 345 tons of graphite is used and approximately 4 tons of uranium metal and 40 tons of compressed $UO_2$ having a density of about 6 are used. The total number of fissionable bodies is about 27,000.

The spacing of uranium elements in the graphite is such that each unit cell comprising one uranium body and surrounding graphite has a side size of 20 centimeters. The arrangement of the bodies in the graphite is similar to that of a cubic crystal lattice. The K factor for the metal bodies 52 and graphite alone is about 1.07 and for a combination of oxide and metal bodies as set forth above, about 1.054.

Figure 11:
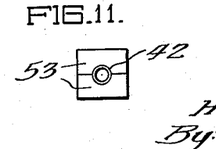
Fig. 11 is a vertical cross-section of a cooling tube in a graphite block (shown in elevation)

The actual construction of the neutronic reactor is started by placing on the foundation of vault 14 several layers of dead graphite blocks to start reflector 16, after which the active portion 15 may be started by piling up alternate layers of dead graphite and live graphite, filling the edges of both live and dead layers out to the concrete side walls, which are lined with the aluminum sheath 9 with dead graphite which forms the reflector 16. The blocks are closely packed without cement to eliminate air spaces as far as possible. Because of the block type of construction, the system is sometimes termed a pile. As the stacking continues, the tubes 42 are installed. This is done as shown in Fig. 11 by splitting a row of dead graphite blocks longitudinally in halves 53, routing out channels for the tubes, laying the tubes in the lower halves and then covering with the upper halves. The clearances between graphite and tube should be as small as possible, from .002″ to .005″.

Figure 12:
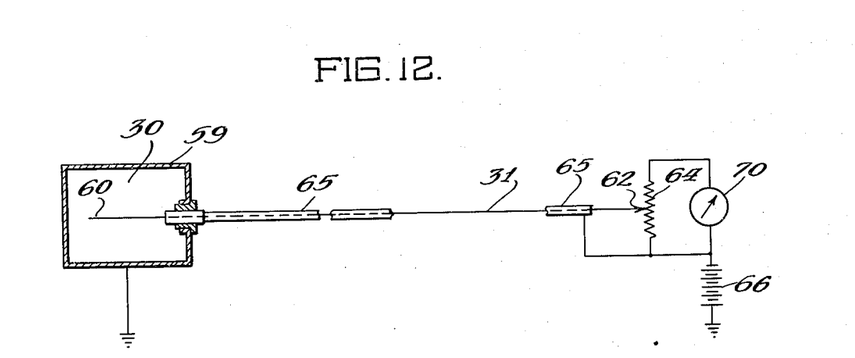
Fig. 12 is a diagram showing a neutron density measuring device and circuit.

When slightly less than half the required number of layers have been piled in the vault, the aluminum lined slots 41 are provided in a dead carbon layer through which the safety rods slide, and the safety rods 40 installed. After a few more layers are added to the pile, the aluminum lined control rod slot 33 is built in, the control rod 32 inserted, and the ionization chamber 30 installed. Wire line 31 is led to the outside and connected to a monitoring circuit, as shown in Fig. 12.

Ionization chamber 30 may comprise a sealed metal casing 59 containing approximately 18 liters of boron fluoride at 1 atmosphere pressure into which projects a central electrode 60. The central electrode is connected through central wire 31 to a contact 62 adjustable across resistor 64. One end of resistor 64 is connected to an outer wire shield 65 to a battery 66 of about 450 volts of potential, the other end of which is grounded, as is casing 59. The other end of resistor 64 is connected through galvanometer 70 to the wire shield side of battery 66. Neutron absorption by the boron in the chamber causes alpha ray ionization in the chamber, the amount thereof being measured by galvanometer 70. Only the ionization chamber need be in the neutronic reactor, with the galvanometer positioned up to 300 feet away, and as the neutron density at any given point in the reactor bears a substantially constant relationship with the neutron density at any other point in the reactor, the chamber may be in the outer layers of the active portion. The galvanometer deflection is only approximately linear with neutron density, but is reproducible and readily calibrated in terms of neutron density, power or heat, as desired.

Construction is continued, layer by layer, including the tubes 42, with the control rod and safety rods fully inserted into the neutronic reactor. Matching blocks bored with a 3″ hole between the uranium bodies in the live blocks, and similar holes in proper position in the dead blocks, are aligned as layers are added to provide shaft 27.

Preferably, at least from the halfway point, the natural neutron density in the neutronic reactor is monitored as layers are added with water placed in such tubes 42 as are already installed. By plotting the change in neutron density values within the reactor as layers are added thereto, with the control rod and safety rods withdrawn, a prediction can be made in advance as to when the chain reaction in the structure will become self-sustaining. The personnel building the reactor can thus be warned that the critical size is being approached.

With the safety and control rods fully inserted into the structure, the active portion 15 and the reflector 16 are completed to the final size desired, with additional dead carbon blocks being positioned over the top thereof to complete the reflector 16, except for the well 25 and the shaft 27 which are left open. Usually the reactor is constructed somewhat oversize and sufficient neutron absorbers inserted as limiting or shim rods which limit the ultimate maximum neutron reproduction ratio not above about 1.01 and usually about 1.005. Such shim rods or a portion thereof may be removed later if necessary to compensate for poisoning effects of fission products or for other causes. When the active portion has been completed the top and front of the vault are closed, except for the outward continuation of the well 25 and shaft 27 by means of the cement blocks and the aluminum lines. The headers 43 and 44 are connected to tubes 42. A structure is thus obtained having an active portion 15 therein, surrounded by a water cooled carbon reflector 16, and enclosed in concrete walls on all sides except for the carbon projection 17 utilized to carry the control and safety rods to the exterior of the vault, and provided with means for circulating fluid through the reflector at the periphery of the active portion.

The structure has been shown as surrounded with a layer of graphite, which will reflect back into the active portion some of the neutrons which might otherwise diffuse out of the system. As neutrons diffuse through this layer in random paths, a small percentage of the neutrons entering the layer are turned around and re-enter the active portion 15. To the extent that the neutrons are returned to the active portion 15, the graphite layer acts as a reflector. This material is known as a scattering material and preferably has a low neutron absorption characteristic. Such elements as lead, deuterium oxide or bismuth may also be used. The thickness of the graphite reflector 16 may be on the order of one to three feet or more, depending upon the size of the active portion and the degree of scattering required. By using this peripheral layer of scattering material, the overall size of the active portion 15 can be slightly smaller than in a case where no scattering layer is employed, as neutron losses to the exterior are reduced. Other arrangements and combinations may be used to produce a satisfactory reflector, but for the present purposes, since the reflector per se forms no part of this invention, the foregoing specific example will suffice.

The coolant tubes 42 are placed into the reflector far enough away from the uranium bearing portion of the reactor so that minimum interference with scattering will occur and so that the majority of the neutrons absorbed by the tubes and coolant therein will be those neutrons that would normally be lost from the reactor in spite of the use of the reflector.

The concrete walls serve as the main shield to prevent gamma radiation escaping outside the structure, as carbon being a light material absorbs gamma rays only to a relatively small extent. The water in the concrete as well as the water in tubes 42 also serve to absorb neutrons escaping through the reflector.

Figure 13:
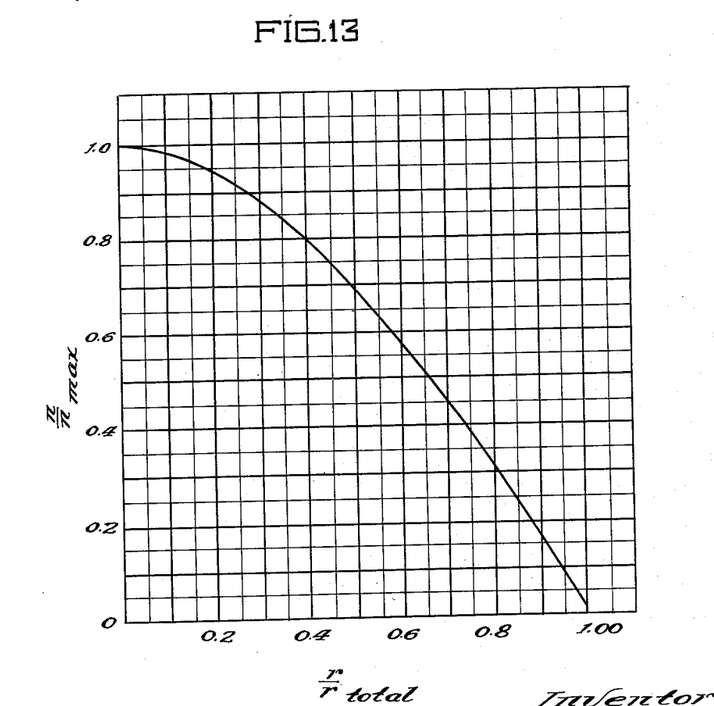
Fig. 13 is a chart or diagram showing neutron density distribution across a chain reacting system.

In Fig. 13 a curve is shown wherein the ratio of neutron density to maximum neutron density at the center of the active portion is plotted against the ratio of the partial radius to the total radius of the active portion. It will be noted that the graph is substantially a cosine curve and that there is a flux representing the exterior loss extending beyond the total radius. While this loss in a carbon-uranium neutronic reactor represents about 4 percent of the neutrons generated, the surface density at any point is small with respect to the maximum density. Since the number of fissions in the active portion is proportional to neutron density and the heat is due to the fissions, the diagram clearly indicates where the heat is released. Consequently, the heat distribution curve from the center to the side of the active portion approximates the neutron density distribution curve. For this reason, if it were desired to use uranium oxide lumps together with uranium lumps, the oxide lumps would be located at the periphery of the reactor where least heat is developed and the metal lumps located in the central portion of the reactor where most heat is developed.

While neutronic reactors only externally and conductively cooled in air can operate at 5000 to 10,000 kilowatts, they can do so for short periods only since the heat evolved tends to overheat the reactor within a very short time. By cooling the reactor the neutron reaction can be conducted more rapidly and thus the rate of production of the products of such reaction (fission products, $94^{239}$ etc.) is correspondingly more rapid. It is therefore of great advantage to be able to operate chain reacting reactors at high neutron densities (high power) continuously in order to obtain maximum output.

After the structure has been completed, it is ready for operation, utilizing the ability of the control rod to absorb neutrons. Full circulation of the coolant is started, and the neutron absorbing safety rods 40 are withdrawn from the active portion 15. The neutron absorbing control rod 32 is then slowly retracted until the galvanometer 70 indicates that the neutron density is rising. If a slow rise is desired, the rod is retracted only enough to indicate a rise but if a faster rise is desired, the rod is retracted further to increase further the reproduction ratio in the system.

When any desired neutron density is reached, the control rod is pushed back into the neutronic reactor until a point is found where the neutron density remains constant. At this point the system is balanced with a neutron reproduction ratio of unity. No special source of neutrons is needed in the structure, as the natural neutrons always present constantly diffusing through the reactor are sufficient to start the reaction.

To again increase the neutron density, the control rod is moved outwardly in such manner and to such extent that the neutron density rises and attains the new desired value, at a desired rate, and then the control rod is moved in to the point where the system is again balanced, thus stabilizing the reaction at the new neutron density. If it is desired to decrease the neutron density, the control rod is pushed into the neutronic reactor until the reproduction ratio is less than unity and the neutron density decays to the desired value. Then the control rod is retracted to the position at which balance is re-established. In this manner, any desired neutron density within the heat dissipating limits of the structure may be obtained and maintained. The position of the control rod in the system, therefore, does not directly govern the neutron density in the reactor, but only the rate of change of the density which, in turn, determines the density as just explained.

The neutronic reactors herein described have a maximum possible reproduction ratio $r$ of about 1.005, causing a doubling of the neutron density every 8 seconds with the control and safety rods completely removed. This slow rise renders the reactor always easy to control and safe to operate. The low reproduction ratio in the system obtained from a geometry giving an overall K factor of 1.06 is due to the fact that the system is built close to critical size and that large quantities of neutrons are deliberately permitted to leak from well 25 and shaft 27 for use outside the reactor.

The unity reproduction ratio position of the control rod within the neutronic reactor for maintaining any desired neutron density would always be the same were it not for the fact that the temperature within the reactor changes to some extent and influences the neutron losses in the materials. Such changes cause moderate changes in the K factor which may be compensated for by adjustment of the control rod. The unity reproduction ratio point on the control rod, therefore, changes slightly in accordance with the temperature at which the reactor is being operated. Such changes are relatively small and the balanced position of the rod can readily be calibrated for temperature effect if desired.

If at any time it is desired to stop the reaction, the control rod is inserted deep within the neutronic reactor until the reproduction ratio becomes less than the value necessary to maintain the reaction with this size of structure. The neutron density then decays to that of the natural neutrons. The safety rods are also inserted when the reactor is left unattended.

The reactor as described has many uses. Radioactive fission products and new elements, both radioactive and stable, are produced by fission and absorption of neutrons in the uranium. Large quantities of neutrons and penetrating gamma rays are produced and can be utilized.

The radioactive fission products and the $94^{239}$ produced by normal operation of the neutronic reactor can be recovered after a predetermined exposure of the uranium bodies in the reactor to high neutron densities by removing the uranium bodies, dissolving them in a suitable solution, and extracting the desired elements. This separation does not constitute any part of the present invention and, therefore, no details are given herein. Radioactive fission products are valuable as gamma radiation sources and for use as biological tracers in medicine, while $94^{239}$ is useful as a fissionable material to increase K factors when added to natural uranium, or when used alone, in chain reacting systems.

Well 25, extending through the concrete and carbon shield and exposing the outer layer of uranium bodies, permits substantially the entire energy spectrum of neutrons in the neutronic reactor to reach the interior of the well. Therefore, well 25 can be packed with any material desired and the scattering effect of the material determined, for example. Again, isotopes of or transmutations to various elements can be produced in large quantities by packing these elements into the well and exposing them to the action of the neutrons escaping from the periphery of the neutronic reactor. As an example of isotope production, followed by transmutation, $U^{233}$ can be produced from thorium 232 in well 25 in accordance with the product of the slow neutron density in the well and time of exposure. Thorium 233 then decays to form protactinium 233 and thence to uranium $92^{233}$ which is valuable as a fissionable material similar in its action to $U^{235}$ and $94^{239}$. The reaction is as follows:

$$_{90}Th^{232} + n' \longrightarrow {}_{90}Th^{233} + \text{gamma rays}$$

As a further example of transmutation, radioactive carbon may be produced by allowing the neutrons leaving the neutronic reactor to react with nitrogen in compound form in well 25. This reaction gives rise to carbon of mass 14 which is radioactive, and can be separated chemically from the nitrogenous compounds. Such radioactive carbon is very suitable for medical and physiological uses as it may be incorporated in organic compounds and used as tracers in living organisms.

In utilizing the output of the neutronic reactor, shaft 27 plays an important role. While shaft 27 is interrupted by aluminum sheath 9, the thickness of the sheath is not great enough as to affect materially the passage of neutrons so that it may be said that the shaft extends to the center of the reactor where the highest neutron density exists, and intense neutron bombardment of materials inserted into this shaft will take place, particularly at high neutronic reactor powers. Furthermore, the shaft acts to collimate the fast neutrons released at the center of the reactor and a high density collimated beam of neutrons emerges through the aperture, projected upwardly. This collimated beam, having a far greater neutron density than any hitherto produced by other means, can be utilized outside of the reactor for nuclear research in all of its aspects. The number of neutrons escaping from shaft 27 is about four or five times the number escaping over an area of the external surface of the reactor equal to the cross-section of shaft 27.

In addition, extremely high energy gamma rays are emitted during nuclear fission. These rays also escape through shaft 27 to the exterior of the neutronic reactor and can there be used for taking radiographs through large castings, for example, with relatively short exposures during high power operation of the reactor. The neutrons coming from the reactor can be screened out of the gamma ray beam by the use of relatively thin sheets of materials having high neutron absorption cross-sections without substantially reducing the gamma ray intensity. In addition, a bismuth filter has been found to effectively reduce the gamma rays without substantial interference with the neutron beam. Thus, shaft 27 can be used either to produce a high intensity collimated neutron beam, or to produce a high energy beam of gamma rays, as desired, both for use outside the neutronic reactor. When using the reactor in this manner, a heavy sheathing of lead is preferably positioned over the top of the reactor and apertured for well 25 and shaft 27. The personnel working on the top of the reactor will then be adequately protected from the effects of gamma rays generated by the reactor and escaping around the periphery thereof.

It will be seen, therefore, that I have provided a self-sustaining neutron chain reacting system comprising essentially a plurality of fissionable bodies such as uranium dispersed in a suitable moderator such as graphite and having a cooling system at the periphery of the reactor, for example, in the reflector, for the purpose of developing a relatively high rate of power and operating at relatively high neutron density with a minimum absorption of neutrons otherwise available for self-maintenance of the neutronic reacting system.

I have also provided a gaseous medium such as helium for increasing the heat conductivity of the various air spaces contained in the neutronic reactor for allowing better conductivity of heat through the neutronic reactor so that heat may be more readily extracted by an external cooling system. By the provision of such external cooling system, I have provided a neutronic reactor of relatively small size, capable of operating at relatively high neutron densities and high rates of power, or high rates of production of element $94^{239}$, as compared to an uncooled reactor. I have, therefore, provided a very economical and highly efficient neutron reacting system.

While helium has been mentioned as a suitable heating conducting gas, it will be apparent to those skilled in the art that other gases and other media which are better heat conductors may be used for the purpose of filling the voids, provided such materials do not absorb neutrons to an objectionable degree, that are present in the above-described neutronic reactor. It will also be apparent to those skilled in the art that instead of water, other cooling fluid or liquid, such as diphenyl, may be used in the reflector cooling system, and further that instead of using copper tubes, aluminum, beryllium, or other suitable material may be used without departing from the spirit of the present invention.

It is also understood that my invention is not limited to the structure of reactor herein described but is applicable to neutronic reactors generally, including reactors described in the aforementioned Young application and including reactors having moderators other than graphite, for example, deuterium oxide, beryllium, or other neutron slowing medium. In addition the invention may be applied to reactors in which reflector cooling is utilized in conjunction with or in lieu of internal cooling and in which the fissionable component may be $U^{233}$ or $94^{239}$ or other fissionable isotope of element 94 used in conjunction with or in lieu of $U^{235}$.

For the above reasons and for the reason that other modifications of my invention may be suggested to those skilled in the art after having had the benefit of the teachings of the present disclosure, my invention should not be limited except insofar as set forth in the appended claims.

While the theory of the nuclear chain fission mechanism in uranium set forth herein is based on the best presently known experimental evidence, I do not wish to be bound thereby, as additional experimental data later discovered may modify the theory disclosed. Any such modification of theory, however, will in no way affect the results to be obtained in the practice of the invention herein described and claimed.

I claim:

In a neutronic reactor comprising stacked graphite blocks and thermal neutron fissionable material dispersed in said graphite in an amount and concentration to sustain a neutronic chain reaction, the improvement wherein helium gas free of air fills the pores of said blocks and the interfaces therebetween, and there are provided means other than said helium gas and said graphite in thermal conductive contact with the graphite for removing the heat generated in the neutronic reaction, and means for excluding air from said reactor.

References Cited in the file of this patent

UNITED STATES PATENTS

| | | |
|---|---|---|
| 2,206,634 | Fermi et al. | July 2, 1940 |

FOREIGN PATENTS

| | | |
|---|---|---|
| 460,374 | Germany | May 25, 1928 |
| 114,150 | Australia | May 2, 1940 |
| 114,151 | Australia | May 3, 1940 |
| 861,390 | France | Feb. 7, 1941 |
| 233,011 | Switzerland | Oct. 2, 1944 |

OTHER REFERENCES

Power, July 1940, page 414.

Smyth: "Atomic Energy for Military Purposes," pages 22, 70–71, 101, 102, 177, August 1945. Copy may be purchased from Supt. of Documents, Washington 25, D.C.

Atomics, vol. 6, No. 6, pages 4–15, November-December 1950 (a bi-monthly journal published by Technical Publishing Co., Chicago, Ill.).